(12) United States Patent
Park et al.

(10) Patent No.: US 8,175,101 B2
(45) Date of Patent: May 8, 2012

(54) MULTICASTING IN A NETWORK USING NEIGHBOR INFORMATION

(75) Inventors: Sung I. Park, Irvine, CA (US); Darryn A. Johnnie, Brea, CA (US)

(73) Assignee: Raytheon Company, Waltham, MA (US)

(*) Notice: Subject to any disclaimer, the term of this patent is extended or adjusted under 35 U.S.C. 154(b) by 377 days.

(21) Appl. No.: 12/508,747

(22) Filed: Jul. 24, 2009

(65) Prior Publication Data

US 2010/0040079 A1   Feb. 18, 2010

Related U.S. Application Data

(60) Provisional application No. 61/089,135, filed on Aug. 15, 2008.

(51) Int. Cl.
H04L 12/28 (2006.01)
(52) U.S. Cl. .................... 370/395.4; 370/408
(58) Field of Classification Search .................. 370/252, 370/389, 395.4, 407–408, 442, 444, 458
See application file for complete search history.

(56) References Cited

U.S. PATENT DOCUMENTS

| | | | |
|---|---|---|---|
| 6,697,379 B1 | 2/2004 | Jacquet et al. | |
| 6,816,460 B1 | 11/2004 | Ahmed et al. | |
| 6,901,064 B2 | 5/2005 | Cain et al. | |
| 7,062,687 B1 | 6/2006 | Gfeller | |
| 7,068,605 B2 | 6/2006 | Cain et al. | |
| 7,082,111 B2 | 7/2006 | Amouris | |
| 7,177,295 B1 | 2/2007 | Sholander et al. | |
| 7,302,700 B2 | 11/2007 | Mao et al. | |
| 7,502,360 B2 | 3/2009 | Liu et al. | |
| 7,610,059 B2 | 10/2009 | Roy et al. | |
| 7,616,565 B2 * | 11/2009 | Park et al. | 370/230 |
| 7,694,008 B2 | 4/2010 | Chang et al. | |
| 7,756,102 B2 | 7/2010 | Aceves | |
| 7,801,153 B2 * | 9/2010 | Anderson et al. | 370/395.4 |
| 7,902,973 B2 | 3/2011 | Thubert et al. | |
| 8,000,314 B2 * | 8/2011 | Brownrigg et al. | 370/351 |

(Continued)

FOREIGN PATENT DOCUMENTS

EP   1 178 625 A   2/2002

(Continued)

OTHER PUBLICATIONS

Notification of Transmittal of the International Search Report and the Written Opinion of the International Searching Authority, or the Declaration, PCT/US2009/067459 date of mailing Feb. 17, 2010, 7 pages.

(Continued)

*Primary Examiner* — Ricky Ngo
*Assistant Examiner* — Phuongchau B Nguyen
(74) *Attorney, Agent, or Firm* — Daly, Crowley, Mofford & Durkee, LLP

(57) ABSTRACT

In one aspect, a method to multicast in a network includes determining using a processor a least amount of relay nodes for use in multicasting a message to nodes in the network by using a neighbor matrix of a source node used in Node Activation Multiple Access (NAMA) scheduling. The method may include designating a one-hop neighbor that exclusively accesses the two-hop neighbor of the source node as a relay node. The method may also include designating a one-hop neighbor of the source node with accessibility to a maximum number of two-hop neighbors of the source node as a relay node.

12 Claims, 12 Drawing Sheets

U.S. PATENT DOCUMENTS

| | | | |
|---|---|---|---|
| 8,014,279 B2* | 9/2011 | Park et al. ................... | 370/230 |
| 2002/0012337 A1 | 1/2002 | Schmidl et al. | |
| 2003/0067892 A1 | 4/2003 | Beyer et al. | |
| 2003/0202469 A1* | 10/2003 | Cain ............................ | 370/230 |
| 2003/0206561 A1 | 11/2003 | Schmidl et al. | |
| 2003/0231588 A1 | 12/2003 | Roth et al. | |
| 2005/0007962 A1 | 1/2005 | Nam et al. | |
| 2005/0083848 A1* | 4/2005 | Shao et al. ................... | 370/238 |
| 2006/0126847 A1 | 6/2006 | Ho | |
| 2006/0268879 A1* | 11/2006 | Xhafa et al. ................. | 370/392 |
| 2007/0019594 A1 | 1/2007 | Perumal et al. | |
| 2007/0104177 A1 | 5/2007 | Hwang et al. | |
| 2007/0195817 A1 | 8/2007 | Denney et al. | |
| 2008/0089398 A1 | 4/2008 | Cormier et al. | |
| 2008/0198815 A1 | 8/2008 | Liu | |
| 2008/0205431 A1 | 8/2008 | Park et al. | |
| 2008/0209004 A1 | 8/2008 | Hare et al. | |
| 2009/0052406 A1 | 2/2009 | Park et al. | |
| 2009/0054073 A1 | 2/2009 | Roy et al. | |
| 2009/0086752 A1 | 4/2009 | Anderson et al. | |
| 2009/0252102 A1* | 10/2009 | Seidel et al. ................. | 370/329 |
| 2009/0252134 A1* | 10/2009 | Schlicht et al. .............. | 370/338 |
| 2010/0040079 A1* | 2/2010 | Park et al. ..................... | 370/432 |
| 2010/0185779 A1 | 7/2010 | Ramadas | |
| 2011/0164527 A1* | 7/2011 | Mishra et al. ................ | 370/252 |

FOREIGN PATENT DOCUMENTS

| | | |
|---|---|---|
| EP | 1371183 A1 | 12/2003 |
| JP | 2003 046595 A | 2/2003 |
| KR | 2002 0055285 | 7/2002 |
| WO | WO 0048367 A2 | 8/2000 |
| WO | WO 0048367 A3 | 8/2000 |
| WO | WO 0128170 A2 | 4/2001 |
| WO | WO 0128170 A3 | 4/2001 |
| WO | WO 03/090083 A1 | 10/2003 |
| WO | WO 2008/016495 A2 | 2/2008 |
| WO | WO 2009/046143 A2 | 4/2009 |

OTHER PUBLICATIONS

Written Opinion of the International Searching Authority, PCT/US2009/067459 date of mailing Feb. 17, 2010, 7 pages.

Sung Park et al.: "Dynamic control slot scheduling algorithms for TDMA based Mobile Ad Hoc Networks", Military Communications Conference, 2008. Milcom 2008. IEEE, Piscataway, NJ. Nov. 16, 2008, 7 pages. XP031408374. ISBN: 978-1-4244-2676-8.

International Preliminary Report on Patentability (Form PCT/IB/326) and Written Opinion of the International Search Authority (Form PCT/ISA/237) for PCT/US2008/071407, dated Mar. 4, 2010, 12 pages.

Notification of Transmittal of the International Search Report and the Written Opinion of the International Searching Authority, or the Declaration, PCT/US2010/021719 dated Apr. 23, 2010, 5 pages.

Written Opinion of the International Searching Authority, PCT/US2010/021719 dated Apr. 23, 2010, 9 pages.

Haas Z J et al.: "Evaluation of the Ad-Hoc Connectivity with the Zone Routing Protocols", Proceedings of Annual Virginia Tech Symposium on Wireless Personal Communications, Jun. 10, 1998, pp. 201-212, XP008001971.

Chakeres Group Cengen C Perkins Wichorus I: "Dynamic MANET On-demand (DYMO) Routing; draft-ietf-manet-dymo-17.txt", Dynamic MANET On-Demand (DYMO) Routing; Draft-IETF-MANET-DYMO-17.TXT, Internet Engineering Task Force, IETF; Standardworkingdraft, Internet Society (ISOC) 4, Rue Des Falaises Ch-1205, Geneva, Switzerland, vol. manet, No. 17, Mar. 8, 2009, XP015061015.

Bao L et al.: "A New Approach to Channel Access Scheduling for Ad Hoc Networks", Proceedings of the 7$^{th}$ Annual International Conference on Mobile Computing and Networking, MOBICOM 2001. Rome, Italy, Jul. 16-21, 2001 [Annual International Conference on Mobile Computing and Networking], New York, NY: ACM, US LNKD-DOI:10.1145/, vol. CONF. 7, Jul. 16, 2001, pp. 210-220, XP001072006, ISBN: 978-1-58113-422-3.

U.S. Appl. No. 11/678,668, filed Feb. 26, 2007.

U.S. Appl. No. 11/842,998, filed Aug. 22, 2007.

U.S. Appl. No. 12/356,778, filed Jan. 21, 2009.

International Search Report (Form PCT/ISA/210) and Written Opinion of the International Searching Authority (Form PCT/ISA/237), for PCT/US2008/051276, Aug. 18, 2008, 9 pages.

Notification of Transmittal of the International Search Report and the Written Opinion of the International Searching Authority, or the Declaration, PCT/US2008/077331 dated Jan. 28, 2009.

Notification of Transmittal of the International Search Report and the Written Opinion of the International Searching Authority, or the Declaration dated Dec. 4, 2008, PCT/US2008/071407.

International Search Report PCT/US2008078501 dated Apr. 28, 2009, 1 page.

Lichun Bao: "MALS: multiple access scheduling based on Latin squares" Military Communications Conference, 2004. MILCOM 2004. 2004 IEEE Monterey, CA, USA Oct. 31-Nov. 3, 2004, Piscataway, NJ, USA, IEEE, vol. 1, Oct. 31, 2004, pp. 315-321, XP010827102 ISBN: 987-0-7803-8847-5 whole document, in particular p. 320, left column, 2$^{nd}$ and 3$^{rd}$ paragraph.

Lichun Bao, et. al. : "Hybrid channel access scheduling in ad hoc networks" Network Protocols, 2002. Proceedings. 10$^{th}$ IEEE International Conference on Nov. 12-15, 2002 Piscataway, NJ, USA, IEEE, Nov. 12, 2002, pp. 46-57, XP010632566. ISBN: 978-0-7695-1856-5, abstract, chapter 3.1.

Vaidya et al, "Distributed Fair Scheduling in a Wireless LAN", IEEE Trans. on Mobile Computing, vol. 4, No. 6, (Nov. 2005), pp. 616-629.

Shiann-Tsong et al., "A Bandwidth Allocation/Sharing/Extension Protocol for Multimedia Over IEEE 802.11 Ad Hoc Wireless LANs", IEEE Journal on Selected Areas in Communication, vol. 19, No. 10, (Oct. 2001), pp. 2065-2080.

Qi et al., "Ad hoc QoS on-demand routing (AQOR) in mobile ad hoc networks," Journal of Parallel and Distributed Computing 63, (2003), pp. 154-165.

Arthur Anderson, et al., "Method for Increasing The Successful Outcomes of a Fair Coin Flip Using a Node Weight Metric in a Communication System", U.S. Appl. No. 60/976,730, filed Oct. 1, 2007, 11 pages.

Sung I. Park et al., "Multicasting in a Network Using Neighbor Information", U.S. Appl. No. 61/089,135, filed Aug. 15, 2008 50 pages.

Sung I. Park et al., "Multicasting in a Network Using Neighbor Information", U.S. Appl. No. 12/508,747, filed Jul. 24, 2009 43 pages.

Notification of Transmittal of the International Search Report and the Written Opinion of the International Searching Authority, or the Declaration, PCT/US2009/052366, dated Dec. 3, 2009, 6 pages.

Written Opinion of the International Searching Authority, PCT/US2009/052366, dated Dec. 3, 2009, 11 pages.

Notification of Transmittal of the International Search Report and the Written Opinion of the International Searching Authority, or the Declaration, PCT/US2007/021640 dated Jun. 20, 2008, 6 pages.

Written Opinion of the International Searching Authority, PCT/US2007/021640 dated Jun. 20, 2008, 10 pages.

Clausen et al., "Optimized Link State Routing Protocol (OLSR); rfc3626.txt" IETF Standard, Internet Engineering Task Force, IETF, CH, Oct. 1, 2003, XP015009408, ISSN: 0000-0003, 75 pages.

Qayyum et al., "Multipoint relaying for flooding broadcast messages in mobile wireless networks", System Sciences, 2001. HICSS. Proceedings of the 35$^{th}$ Annual Hawaii International Conference on Jan. 7-1-, 2001, Piscataway, NJ, USA, IEEE, Los Alamitos, CA, USA, Jan. 7, 2001, pp. 3898-3907, XP010587721, ISBN: 978-0-7695-1435-2, 10 pages.

Lim et al., "Flooding in wireless ad hoc networks", Computer Communications, Elservier Science Publishers BV, Amsterdam, NL, vol. 24, No. 3-4, Feb. 15, 2001, pp. 353-363, XP004248987, ISSN: 0140-3664, 11 pages.

Peng et al., "AHBP: an efficient broadcast protocol for mobile ad hoc networks", Journal of Computer Science and Technology, Science Press, Beijing, CN, vol. 16, No. 2, Mar. 1, 2001, pp. 114-125, XP008099976, ISSN: 1000-9000, 12 pages.

Bao et al., "A New Approach to Channel Access Scheduling for Ad Hoc Networks" Proceedings of the 7$^{th}$ Annual International Conference on Mobile Computing and Networking. Mobicom 2001. Rome, Italy, Jul. 16-21, 2001; [Annual International Conference on Mobile Computing and Networking], New York, NY: ACM, US, vol. Conf. 7, Jul. 16, 2001, pp. 210-220, XP001072006, ISBN: 978-1-58113-422-3, 11 pages.

Notification Concerning Transmittal of International Preliminary Report on Patentability (Chapter I of the Patent Cooperation Treaty) PCT/US2008/051276 dated Sep. 3, 2009, 2 pages.

Written Opinion of the International Searching Authority PCT/US2008/051276 dated Sep. 3, 2009, 5 pages.

Sung Park et al., "Network Communication Scheduling", U.S. Appl. No. 11/678,668, filed Feb. 26, 2007.

Sung Park et al., "Communication Scheduling of Network Nodes", U.S. Appl. No. 11/842,998, filed Aug. 22, 2007.

Denh T. Sy, et al., "Communication Scheduling of Network Nodes Using a Cluster Coefficent", U.S. Appl. No. 12/356,778, filed Jan. 21, 2009.

Sung I. Park et al., "Cross Layer Routing (XRP) Protocol", U.S. Appl. No. 12/425,753, filed Apr. 17, 2009.

Application: Denh T. Sy, et al., "Communication Scheduling of Network Nodes Using a Cluster Coefficent", U.S. Appl. No. 12/356,778, filed Jan. 21, 2009.

Application: Sung I. Park et al., "Cross Layer Routing (XRP) Protocol", U.S. Appl. No. 12/425,753, filed Apr. 17, 2009.

Arthur Anderson et al., "Communication Scheduling of Network Nodes Using Fair Access and Weighting Techniques", U.S. Appl. No. 11/947,928, filed Nov. 30, 2007.

Daniel R. Cormier et al., "Determining a Mode to Transmit Data", U.S. Appl. No. 11/548,763, filed Oct. 12, 2006.

Notification Concerning Transmittal of International Preliminary Report on Patentability (Chapter 1 of the Patent Cooperation Treaty), PCT/US2009/052366, date of mailing Feb. 24, 2011, 1 page.

Written Opinion of the International Searching Authority, PCT/US2009/052366, date of mailing Feb. 24, 2011, 9 pages.

O. Tickoo, V. Subramanian, S. Kalyanaraman, and K. K. Ramakrishnan, "LT-TCP: End-to-end Framework to Improve TCP Performance Over Networks with Lossy Channels." Quality of Service—IWQoS 2005, Lecture Notes in Computer Science, 2005, vol. 3552/2005, pp. 81-93.

H. Balakrishnan, S. Seshan, and, R. Katz, "Improving reliable transport and handoff performance in cellular wireless networks." ACM Wireless Networks Journal, Dec. 1995.

T. Ho, M. Medard, R. Koetter, D.R. Karger, M. Effros, J. Shi, and B. Leong, "A Random Linear Network Coding Approach to Multicast", IEEE Transaction on Information Theory. vol. 52, Issue 10, pp. 4413-4430, 2006.

U.S. Appl. No. 12/869,895, filed Aug. 27, 2010.

U.S. Appl. No. 11/548,763, filed Oct. 12, 2006.

U.S. Appl. No. 12/425,753, filed Apr. 17, 2009.

* cited by examiner

|  | Timeslot 1 | Timeslot 2 | Timeslot 3 | Timeslot 4 |
|---|---|---|---|---|
| Node 12a | Receive | Receive | Receive | Receive |
| Node 12b | Transmit | Receive | Receive | Receive |
| Node 12c | Receive | Receive | Transmit | Receive |
| Node 12d | Receive | Transmit | Receive | Receive |
| Node 12e | Receive | Receive | Receive | Transmit |

|  | Node 42a | Node 42g | Node 42b | Node 42c | Node 42f | Node 42d | Node 42e |
|---|---|---|---|---|---|---|---|
| Node 42a | N/A | 0 | 80 | 0 | 0 | 0 | 37 |
| Node 42g | 0 | 0 | 80 | 0 | 0 | 0 | 0 |
| Node 42b | 65 | 0 | 0 | 0 | 0 | 0 | 0 |
| Node 42c | 89 | 0 | 0 | 89 | 0 | 0 | 0 |
| Node 42f | 0 | 0 | 80 | 0 | 0 | 0 | 0 |
| Node 42d | 90 | 0 | 0 | 0 | 0 | 0 | 37 |
| Node 42e | 37 | 0 | 0 | 0 | 0 | 90 | 0 |

*FIG. 5*
Prior Art

|  | Node 42a | Node 42g | Node 42b | Node 42c | Node 42f | Node 42d | Node 42e | Covered |
|---|---|---|---|---|---|---|---|---|
| Node 42a | N/A |  |  |  |  |  | N | Yes |
| Node 42g |  |  | N |  |  |  |  |  |
| Node 42b | N |  |  |  |  |  |  | Yes |
| Node 42c | N |  | N |  |  |  |  | Yes |
| Node 42f |  |  |  |  |  |  |  |  |
| Node 42d | N |  |  |  |  |  | N | Yes |
| Node 42e | N |  |  |  |  | N |  | Yes |

FIG. 9B

| | Node 42a | Node 42g | Node 42b | Node 42c | Node 42f | Node 42d | Node 42e | Covered |
|---|---|---|---|---|---|---|---|---|
| Node 42a | N/A | | N | N | | N | N | Yes |
| Node 42g | | | N | | | | | Yes |
| Node 42b | N | | | | | | | Yes |
| Node 42c | N | | N | | | | | Yes |
| Node 42f | | | | | | | | |
| Node 42d | N | | | | | | N | Yes |
| Node 42e | N | | | | | | | Yes |

*FIG. 9C*

MULTICASTING IN A NETWORK USING NEIGHBOR INFORMATION

RELATED APPLICATIONS

This application claims priority to provisional application Ser. No. 61/089,135, entitled "MULTICASTING IN A NETWORK USING NEIGHBOR INFORMATION," filed Aug. 15, 2008, which is incorporated herein in its entirety.

BACKGROUND

In a shared network with multiple users sharing the same frequency, it is desirable to have only one user transmit data at a time. For example, if one user transmits data at the same time another user is transmitting data, collisions occur and data is generally corrupted and lost. One method to reduce collisions in the shared networks is to use time division multiple access (TDMA). TDMA enables several users to share the same frequency by dividing the use of the shared frequency into different timeslots, one user per timeslot. For example, the users transmit data in succession (i.e., one user transmits data after another user transmits data), each user using its own timeslot so that only one user transmits data during a timeslot.

SUMMARY

In one aspect, a method to multicast in a network includes determining using a processor a least amount of relay nodes for use in multicasting a message to nodes in the network by using a neighbor matrix of a source node used in Node Activation Multiple Access (NAMA) scheduling.

In another aspect, an article includes a machine-readable medium that stores executable instructions to multicast in a network. The instructions causing a machine to determine a least amount of relay nodes for use in multicasting a message to nodes in the network by using a neighbor matrix of a source node used in Node Activation Multiple Access (NAMA) scheduling by designating a one-hop neighbor that exclusively accesses a two-hop neighbor of the source node as a relay node, designating a one-hop neighbor of the source node with accessibility to a maximum number of two-hop neighbors of the source node as a relay node and notifying one-hop neighbors of the source node that are selected as relay nodes of their selection as relay nodes.

In a further aspect, an apparatus to multicast in a network includes circuitry to determine a least amount of relay nodes for use in multicasting a message to nodes in the network by using a neighbor matrix of a source node used in Node Activation Multiple Access (NAMA) scheduling by designating a one-hop neighbor that exclusively accesses a two-hop neighbor of the source node as a relay node, designating a one-hop neighbor of the source node with accessibility to a maximum number of two-hop neighbors of the source node as a relay node and notifying one-hop neighbors of the source node that are selected as relay nodes of their selection as relay nodes.

DESCRIPTION OF THE DRAWINGS

FIG. 5 is a prior art table of a neighbor matrix of FIG. 4.

FIGS. 9A to 9D are examples of a neighbor matrix being used in multicasting using the process of FIG. 8.

DETAILED DESCRIPTION

Figures 1, 2:
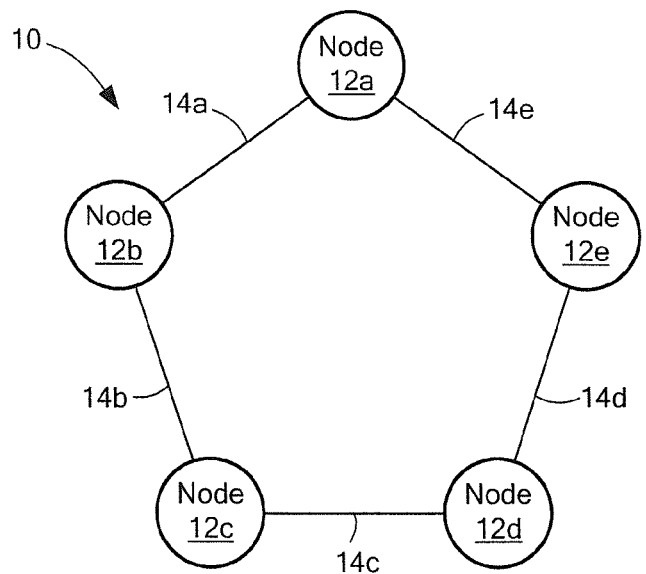
FIG. 1 is a prior art diagram of a communication network having nodes.
FIG. 2 is a prior art table indicating an example of network schedule of communications between the nodes of FIG. 1.

Referring to FIG. 1, a communications network 10 includes nodes (e.g., a first node 12a, a second node 12b, a third node 12c, a fourth node 12d and a fifth node 12e). In one example, the nodes 12a-12e are network routers. In another example, the nodes 12a-12e are wireless radios. The nodes 12a-12e are connected by links representing that the two nodes are within transmit/receive range of each other (e.g., a first link 14a connecting the first node 12a to the second node 12b, a second link 14b connecting the second node 12b to the third node 12c, a third link 14c connecting the third node 12c to the fourth node 12d, a fourth link 14d connecting the fourth node 12d to the fifth node 12e, and a fifth link 14e connecting the fifth node 12e to the first node 12a).

In one example, the links 14a-14e are wireless links. In another example, the links 14a-14e are wired links. In another example, links 14a-14e may be a combination of wireless and wired links. The communications network 10 may be any shared medium.

The first node 12a and the second node 12b are one hop away from each other (i.e., one-hop neighbors). One hop means that the shortest network path from the first node 12a to the second node 12b does not include any intervening nodes (i.e., one link). Likewise the second node 12b and the third node 12c; the third node 12c and the fourth node 12d; the fourth node 12d and the fifth node 12e; and the fifth node 12e and the first node 12a are all one-hop neighbors to each other.

The first node 12a and the third node 12c are two hops away from each other (i.e., two-hop neighbors). Two hops means that the shortest network path from the first node 12a to the third node 12c includes only one intervening node (the second node 12b) (i.e., two links). Likewise the second node 12b and the fourth node 12d; the third node 12c and the fifth node 12e; the fourth node 12d and the first node 12a; and the fifth node 12e and the second node 12b are all two-hop neighbors to each other.

A goal of network communications scheduling is to ensure that only one network node communicates at a time. For example, in a wireless network, if one node transmits data at the same time another node is transmitting data, collisions, which corrupt the data, will occur at a receiving node which is in wireless range of both transmitting nodes. One way used in the prior art to reduce collisions is to use time division multiplexing access (TDMA). One particular implementation of TDMA uses a Node Activation Multiple Access (NAMA) algorithm. NAMA is a wireless multiple access protocol designed to generate dynamic and collision-free TDMA timeslot scheduling. NAMA achieves collision-free TDMA timeslot scheduling by having nodes within one and two hops of each other participate in a cooperative random election process. Each node generates the same random algorithm to determine simultaneously which node transmits data for a particular timeslot.

For example, referring back to FIG. 1, the nodes 12a-12e implement an election process for four timeslots (e.g., timeslot 1, timeslot 2, timeslot 3 and timeslot 4). During each timeslot, each node 12a-12e in the network 10 determines a set of pseudo-random numbers based on each node's ID for those nodes that are within one or two hops distance. The assumption is that each node is aware of all other nodes (e.g., has the node ID of the other nodes) within a two-hop neighborhood. Since each node is using the same pseudo random number generation function to determine the random numbers, each node will come up with a consistent random value for each of the nodes within the two-hop neighborhood. Once a set of values is computed, the node with the highest value transmits during the timeslot.

In one particular example of determining random values, in timeslot 1, the first node 12a is determined to have a value of 4, the second node 12b is determined to have a value of 8, the third node 12c is determined to have a value of 1, the fourth node 12d is determined to have a value of 7 and the fifth node 12e is determined to have a value of 3. Since the second node 12b has the highest value, the second node is the only node that transmits during timeslot 1.

In timeslot 2, the first node 12a is determined to have a value of 3, the second node 12b is determined to have a value of 5, the third node 12c is determined to have a value of 4, the fourth node 12d is determined to have a value of 9 and the fifth node 12e is determined to have a value of 7. Since the fourth node 12d has the highest value, the fourth node is the only node that transmits during time slot 2.

In timeslot 3, the first node 12a is determined to have a value of 2, the second node 12b is determined to have a value of 1, the third node 12c is determined to have a value of 6, the fourth node 12d is determined to have a value of 3 and the fifth node 12e is determined to have a value of 5. Since the third node 12c has the highest value, the third node is the only node that transmits during time slot 3.

In timeslot 4, the first node 12a is determined to have a value of 4, the second node 12b is determined to have a value of 5, the third node 12c is determined to have a value of 2, the fourth node 12d is determined to have a value of 7 and the fifth node 12e is determined to have a value of 8. Since the fifth node 12e has the highest value, the fifth node is the only node that transmits during time slot 2.

FIG. 2 includes a table 20 indicating a transmit schedule for the nodes during the four timeslots in the preceding example. The resulting schedule from the election process achieves a collision-free schedule by allowing only one node to transmit (within one-or two-hop neighbors) during each timeslot.

Figure 3:
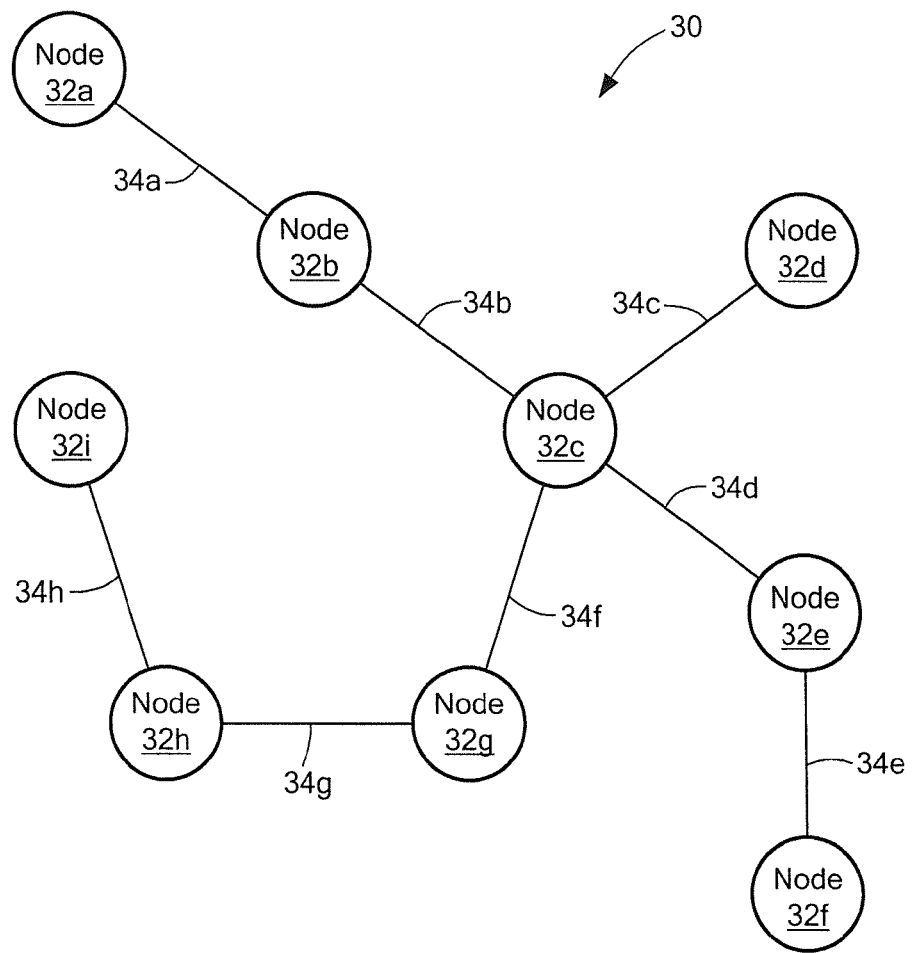
FIG. 3 is a prior art diagram of another communications network.

However, even using the NAMA technique, collisions may still occur if nodes are unaware of the other nodes. For example, referring to FIG. 3, a communications network 30 includes nodes (e.g., a first node 32a, a second node 32b, a third node 32c, a fourth node 32d, a fifth node 32e, a sixth node 32f, a seventh node 32g, an eighth node 32h and a ninth node 32i). The nodes 32a-32i are connected by links (e.g., a first link 34a connecting the first node 32a to the second node 32b; a second link 34b connecting the second node 32b to the third node 32c; a third link 34c connecting the third node 32c to the fourth node 32d; a fourth link 34d connecting the fourth node 32d to the fifth node 32e; a fifth link 34e connecting the fifth node 32e to the sixth node 32f; a sixth link 34f connecting the third node 32c to the seventh node 32g; the seventh link 34g connecting the seventh node 32g to the eighth node 32h; and the eighth link 34h connecting the eighth node 32h to the ninth node 32i).

In this example, the third node 32c has a neighborhood list (e.g., one-hop and two-hop neighbors) that includes the first node 32a, the second node 32b, the fourth node 32d, the fifth node 32e, the sixth node 32f, the seventh node 32g and the eighth node 32h. The ninth node 32i is not in the neighborhood list of the third node 32c because the eighth node is more than two hops away from the third node. The sixth node 32f only includes the fifth node 32e on its neighbor list, in this example. The sixth node 32f is missing the third node 32c (a two-hop neighbor) in its neighbor list. The sixth node 32f has view of the network topology that is inconsistent with the true topology of the network where the third node 32c and the sixth node 32f are two-hop neighbors.

Due to this inconsistency of the sixth node 32f not having the correct network topology, collisions can occur. In particular, using the NAMA technique, each node 32a-32i determines and evaluates the output of a random number function. For example, the first node 32a is determined to have a value of 4, the second node 32b is determined to have a value of 5, the third node 32c is determined to have a value of 9, the fourth node 32d is determined to have a value of 2, the fifth node 32e is determined to have a value of 6, the sixth node 32f is determined to have a value of 7, the seventh node 32g is determined to have a value of 2, the eighth node 32h is determined to have a value of 1 and the ninth node 32i is determined to have value of 8. The sixth node 32f determines that it can transmit during the timeslot since it has the highest output among its two-hop neighbors which only includes the fifth node 32e. Since the third node 32c also determines that it can transmit during the timeslot, the transmission from the third node 32c collides with a transmission from the sixth node 32f at the fifth node 32e.

It is therefore desirable in NAMA scheduling for each node to have a consistent view of the network in order to guarantee collision-free schedules. In contrast to prior art approaches, the description below focuses on an approach to improve network scheduling.

In a dynamic network, a consistency may be achieved by constantly exchanging control information among one-hop neighbors. The control information used in establishing consistency in NAMA scheduling includes at least the node ID of the originator and the node IDs of all the one-hop neighbors of the originator. Upon receiving control information, each node can build up a comprehensive list of neighbors using the node ID of the originator (which becomes one-hop neighbors of the receiver) and node IDs of the one-hop neighbors (which become two-hop neighbors of the receiver).

Figure 4:
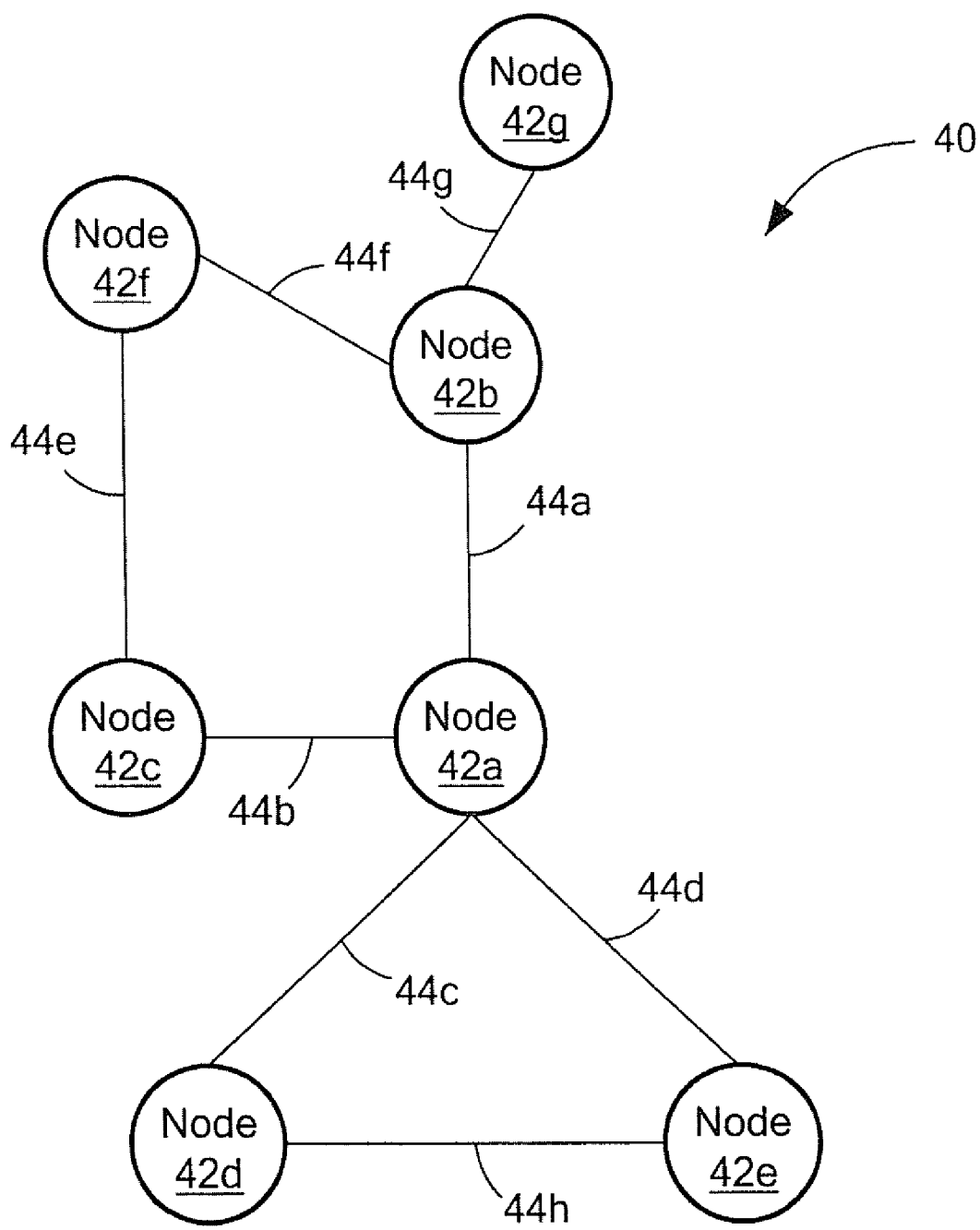
FIG. 4 is a neighborhood of a source node.

Referring to FIGS. 4 and 5, in one example, the network topology transmitted by each node may be represented using a neighbor matrix (FIG. 5 is only labeled prior art to indicate that neighborhood matrices are known in the art). For example, a neighbor matrix 50 of a node 42a represents a neighborhood 40 of node 42a. As will be described below, node 42a represents a source node as used in multicasting. The neighborhood 40 includes one-hop neighbors of node 42a (e.g., a node 42b, a node 42c, a node 42d and a node 42e) and two-hop neighbors (e.g., a node 42f and a node 42g). The nodes 42a-42g are connected by links 44a-44g. For example, the node 42b is connected to the node 42a by the link 44a, the node 42c is connected to the node 42a by the link 44b, the node 42d is connected to the node 42a by the link 44c, the node 42e is connected to the node 42a by the link 44d, the node 42f is connected to the node 42c by the link 44e, the node 42b is connected to the node 42f by the link 44f, the node 42b is connected to the node 42g by the link 44g and the node 42d is connected to the node 42e by the link 44h.

A nonzero value in the neighbor matrix 50 represents that a valid link is present for the node corresponding to the column to the node and the row. For example, the entry 52, having a value of 65, corresponds to the node 42b (i.e., the row) and the node 42a (i.e., the column) and indicates that a link exists from the node 42b to the node 42a (i.e., the link 44a). In one example, the nonzero value represents how long a corresponding link is valid. In one example, the higher the value the longer the link is valid.

Any nonzero value indicates that the corresponding nodes in the table (i.e., row and column) are one-hop neighbors. For example, under a column 56 for the node 42a, the nonzero values correspond to the node 42b, the node 42c, the node 42d and the node 42e and represent the one-hop neighbors of the node 42a. Nonzero value in the other columns (i.e., other than column 56) indicates that the corresponding node in the rows are the one-hop neighbor's neighbor (thus becoming two-hop neighbors of the node 42a). For example, a column 58 corresponding to the node 42b indicates that the one-hop neighbors of the node 42b are the node 42a, the node 42g, and the node 42f. Likewise, each column corresponding to node 42c, node 42e, and node 42d indicates each node's respective one-hop neighbors. Having each one-hop neighbor's neighbor captured in the neighbor matrix 50 accurately reflects the network topology shown in FIG. 4.

As will be shown further, the neighbor information used in NAMA may be further used to contribute to multicasting.

A wireless medium is an ideal channel through which multicast (or a broadcast which is a special case of multicast) traffic can be disseminated. Unlike wired medium where the link may be physically separated among different participating nodes, wireless medium is a shared channel through which nodes that are within the RF range of the source node can overhear the transmissions broadcast/multicast messages avoiding the need to transmit the same message multiple times. The shared characteristic of the wireless medium allows efficient use of bandwidth for multicast message transmission since the source node only needs to transmit multicast message once for all the nodes within the RF range.

Figure 6:
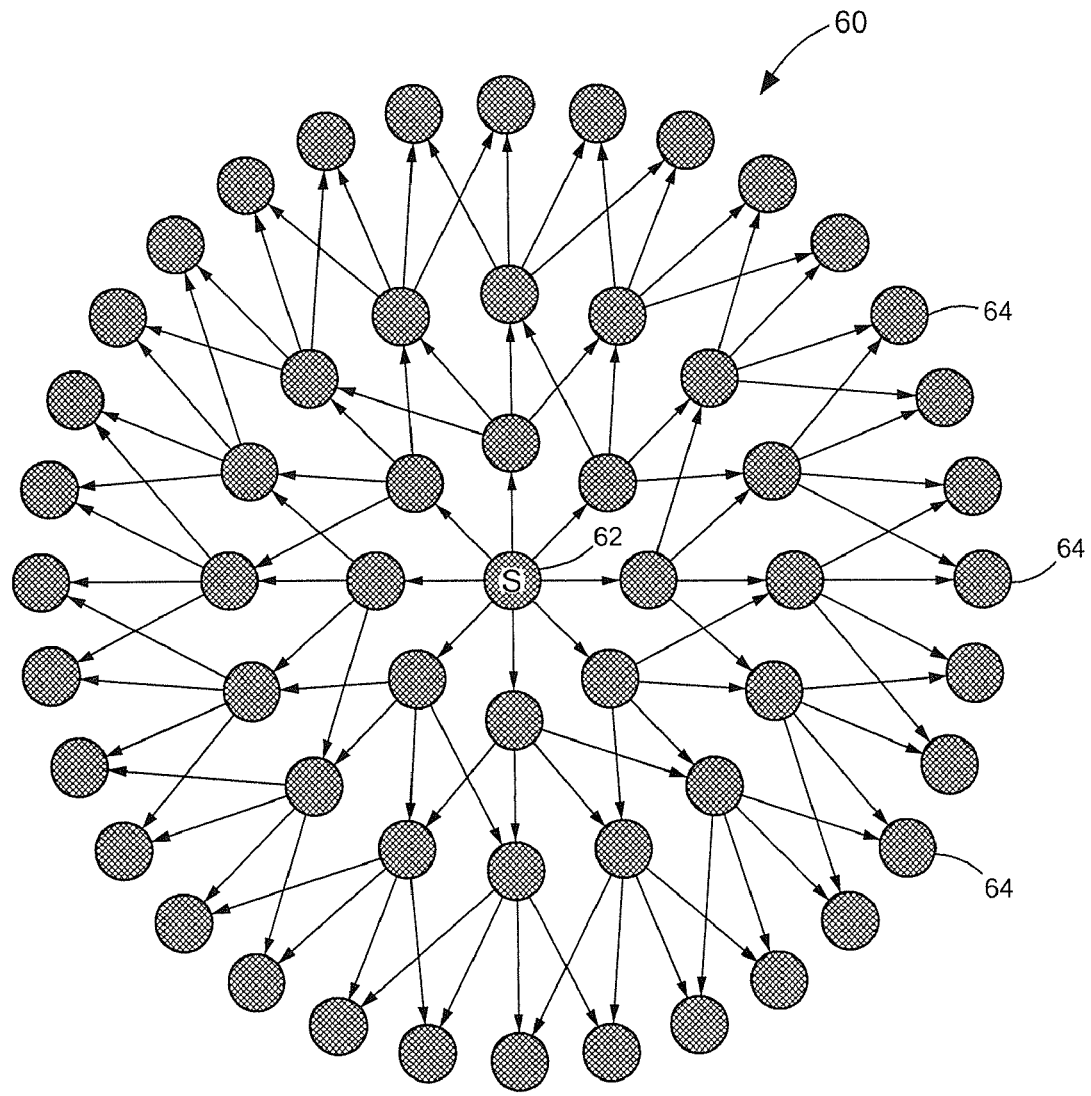
FIG. 6 is a diagram of a communications network including a start node and relay nodes used in multicasting.

Referring to FIG. 6, when a pure flood mechanism is used in transmitting multicast messages in multi-hop wireless networks, a single transmission of a multicast message will trigger each node in the network to transmit the message at least once as it is propagated through the network. This phenomena, often described as "flood storm, will trigger retransmission of the multicast message manifolds causing adverse impact on the performance of network. The impact can be minimized when the network is sparsely connected with each node minimally sharing the same neighbors with other neighbors. However, when this sharing of neighbors is high (which indicates a densely connected network), the impact from the flood storm can produce much overhead, since many of the multicast message transmissions become redundant. The overhead of pure flood mechanism comes from the fact that in high density environment it is likely for the nodes to receive the same multicast message multiple times since each node shares a large number of one-hop neighbors. The overhead of the multicast message transmission caused by pure flood mechanism is shown in FIG. 6. In FIG. 6, the source of the multicast message, the node 62, transmits a multicast message, and subsequently relay nodes 64 forward the message based on pure flood mechanism. Thus, in FIG. 6, all fifty-six relay nodes 64 are to relay the multicast message so that with the topology shown in FIG. 6 a single transmission of multicast message will result in two receptions per node on average (or three if reflected transmission is counted).

Figure 7:
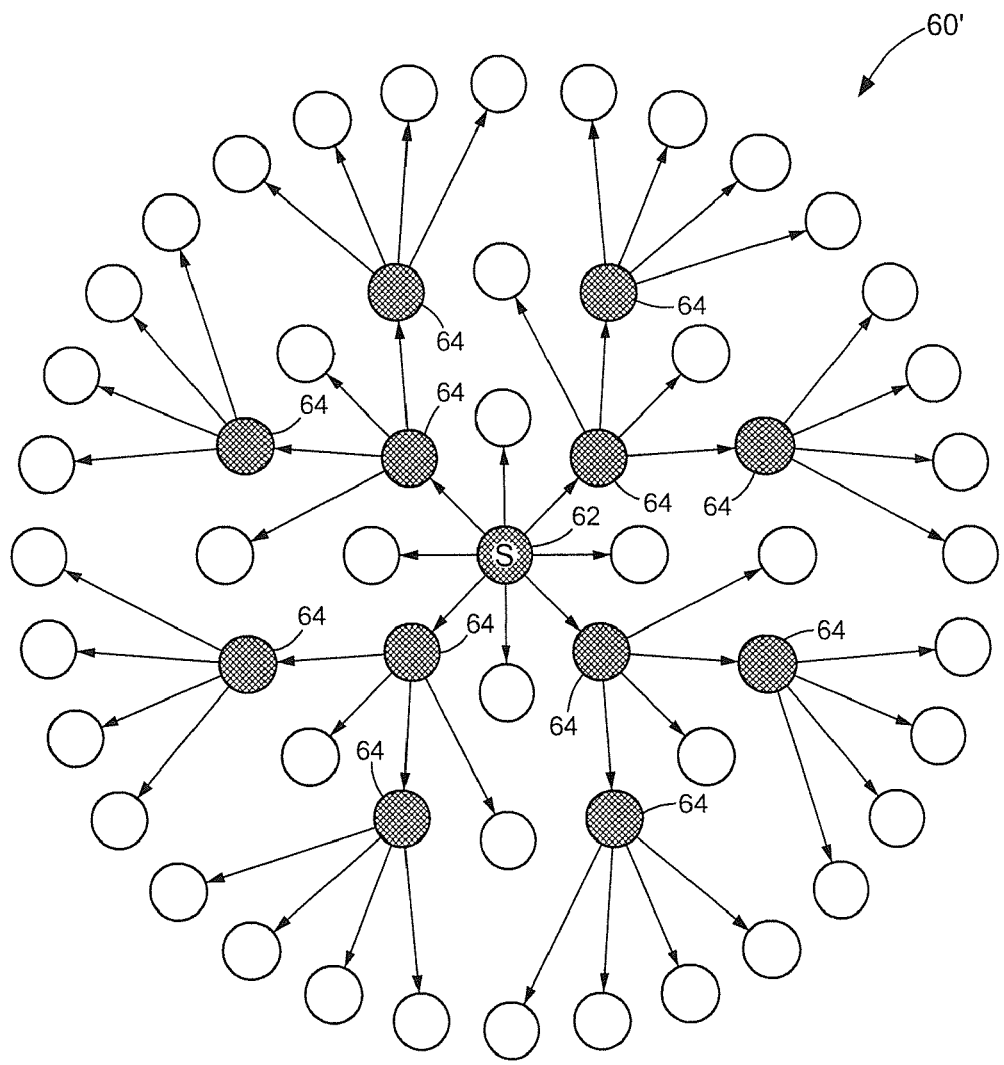
FIG. 7 is a diagram of a communications network including a start node, relay nodes and receive only nodes.

Referring to FIG. 7, a Multipoint Using Neighbor Information (MUNIcast) uses the neighbor information (a neighbor matrix) stored in NAMA, for example, in achieving efficient multicast message routing in Mobile Ad hoc NETwork (MANET) as will be described in FIG. 8. MUNIcast achieves efficient multicast message routing by allowing each node to select only a subset of one-hop neighbors in relaying multicast messages based on one-and two-hop topology information.

For example, compared to pure flood mechanism shown in FIG. 6, a MUNIcast approach reduces the redundant reception thus increasing the bandwidth efficiency by exploiting the neighbor information. The neighbor information allows each node to discover the topology of the network within two hops and using the information each node can select only sufficient nodes (one hop) in forwarding the broadcast/multicast message to ensure all the next hop (two hop) nodes will be able to receive the message at least once. The end result of the MUNIcast approach is shown in FIG. 7. Based on the topology information, the source node, the node 62, and the one-hop neighbors of the node 62 have selected the minimum set of one-hop neighbors to forward the multicast message. The twelve relay nodes 64 forward the multicast message while the remaining nodes are receive only nodes 66. The MUNIcast approach decreases redundant multicast message reception by the nodes compared to the pure flood scenario while ensuring that all the nodes in the network have received the multicast message at least once thus achieving 100% coverage. The resulting improvement in bandwidth efficiency from MUNIcast approach is significant compared to pure flood mechanism when comparing the number of transmission for each approach. The number of total transmission is reduced from 56 relay nodes 64 (pure flood mechanism) to 12 relay nodes 64 (MUNIcast approach). The improvement may become even more when MUNIcast approach is applied to large scale densely connected networks. For example, for a network of 100 nodes which are all one-hop neighbors of each other, using pure flood mechanism, a single transmission will result in 100 transmissions. On the other hand, using MUNIcast approach, the original transmission by the source will be the only transmission that will occur since the source has 100% coverage of the whole network. The improvement in such a network will effectively reduce the number of transmissions by hundred-fold.

Finding a minimum set of one-hop neighbors that has the 100% coverage of two-hop neighbors is known to be NP-complete. When the number of one-hop neighbors is small, it may be possible to evaluate all possible combinations of one-hop neighbors to find the minimum set. However, when the number of one-hop neighbors becomes large, finding the minimum set will become a processing intensive task. In order to balance the processing constraint and the need for finding the minimum set of multicast relay, a heuristic algorithm, called Multipoint Relaying for Flooding Broadcast Messages (MRFBM) can be used. The first step of the MRFBM algorithm is to select one-hop neighbors exclusively neighboring any two-hop neighbors among two-hop neighbors of the source node. After the selection, the MRFBM algorithm iteratively determines and includes one-hop neighbors that have the maximum number of two-hop neighbors that have not been yet accounted for to receive the multicast message. The MRFBM algorithm terminates when 100% coverage among two-hop neighbors is achieved.

One of the shortfalls of the MRFBM approach is its use of global positional information in determining and one-and two-hop topology information. In typical wireless systems, positional information may not be available unless the wireless hardware is equipped with Global Positioning System (GPS) receiver. Even with GPS receivers, wireless systems may not be able to readily attain the positional information when placed under heavy foliage or indoor, thus making the prior approach useless when such information is not available. Moreover, even if the positional information is available, positional information alone is a poor metric to determine the network topology due to inconsistent Radio Frequency (RF) propagation characteristics. RF propagation pattern in real world is often uneven and unreliable due to fast, slow fading caused by mobility, multipaths, and interference from other RF sources. Thus, a topology based on positional information alone will be a poor estimate of the true topology.

Figure 8:
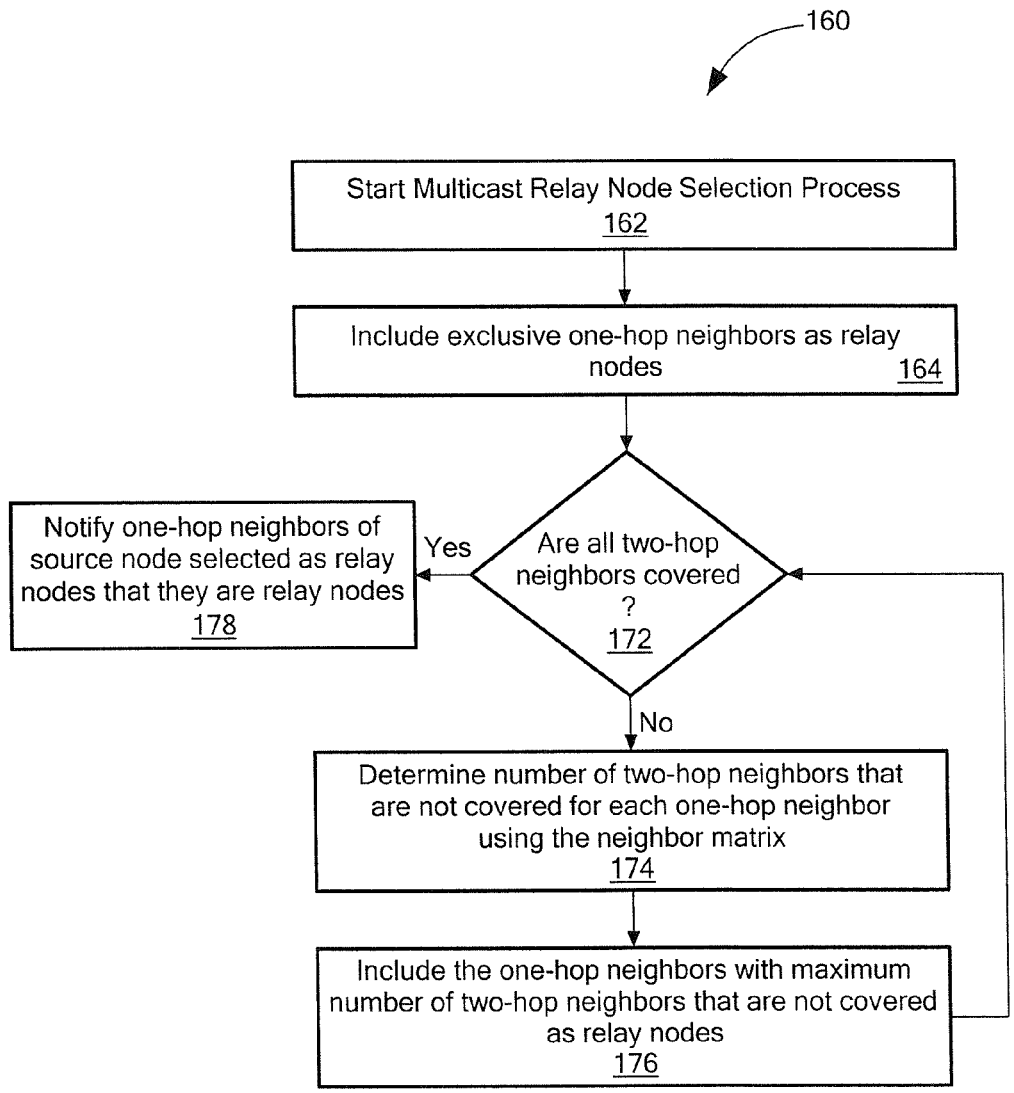
FIG. 8 is a flowchart of an example of a process used in multicasting.

Referring to FIG. 8, an example of a process used in multicasting is a process 160. The process 160, the MUNIcast algorithm, uses data link layer neighbor information for determining one-and two-hop topology which overcomes the shortfalls of the MRFBM approach. The process 160 determines a multicast relay set that contains the minimum number of nodes used to relay the multicast message. By selecting the minimum number of relay nodes to transmit the multicast message, the process 160 enables the most efficient use of bandwidth while guaranteeing the multicast messages get to every node in a network. The advantage of process 160 over MRFBM is use of data link layer neighbor information. For example, the neighbor information (e.g., from the neighbor matrix), is a neighbor information maintained by NAMA data link layer protocol to construct efficient transmission schedules.

Process 160 starts multicast relay node selection (162). For example, the selection process begins with a multicast relay set that is empty. The process 160 includes exclusive one-hop neighbors as relay nodes (164). For example, a neighbor matrix 50' is used to determine exclusive one-hop neighbors (see FIGS. 9A-9D). Process 160 determines if all the two-hop neighbors are covered (172). As used herein "covered" means already accounted for in the determination of relay nodes. If not all of the two-hop neighbors are covered, process 160 determines a number of two-hop neighbors that are not covered for each one-hop neighbor by using the neighbor matrix (e.g., the neighbor matrix 50') (174) and includes the one-hop neighbors with a maximum number of two-hop neighbors that are not covered as relay nodes (176). If all the two-hop neighbors are covered, process 160 notifies those one-hop neighbors of the source node that have been selected as relay nodes that they are relay nodes (178).

Figure 9A:
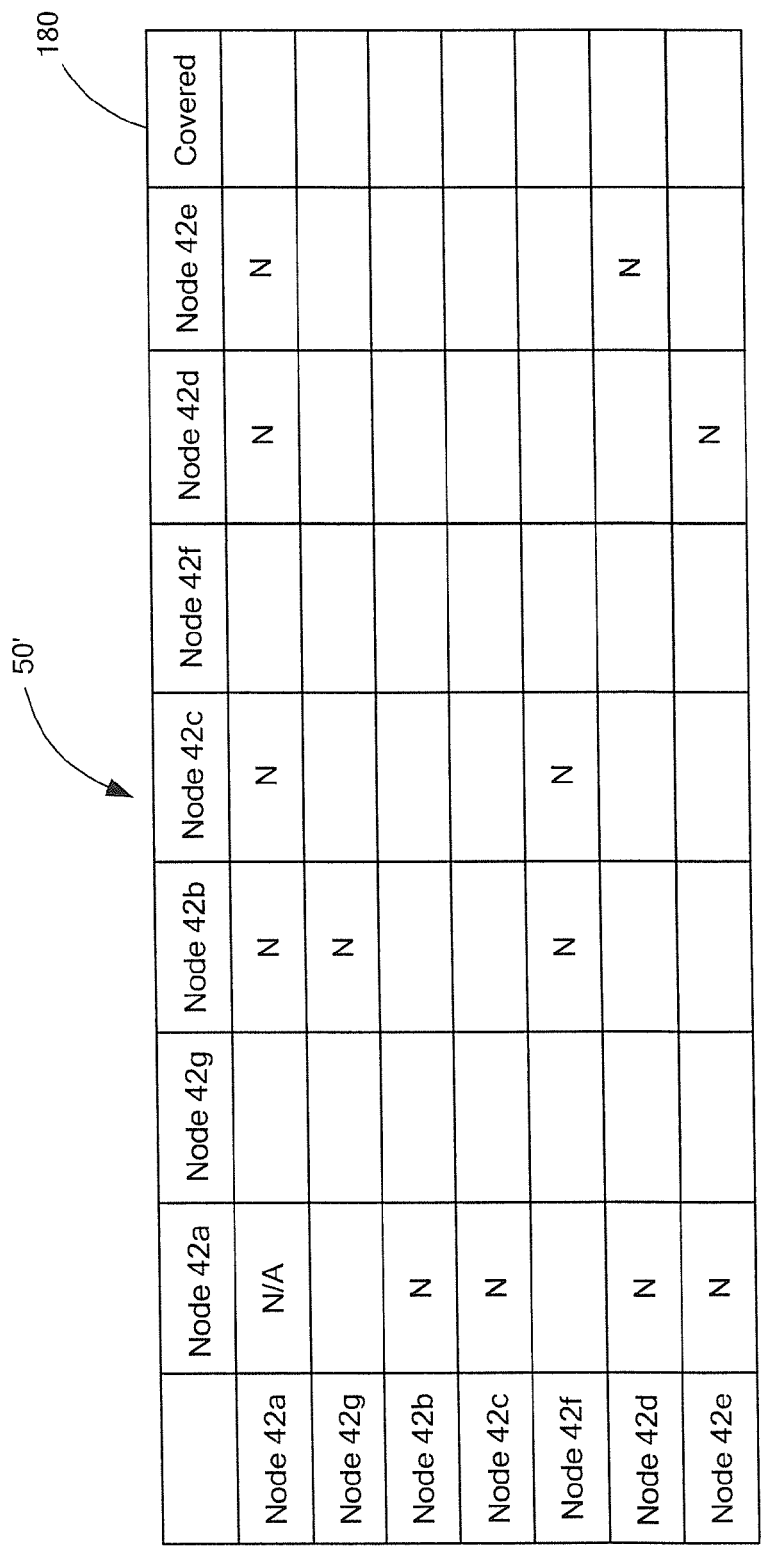

Referring to FIG. 9A, the process 160 uses the neighbor matrix 50' which is the same as neighbor matrix 50 (FIG. 5) but includes a covered column 180. Like neighbor matrix 50, neighbor matrix 50' reflects a neighborhood of the node 42a (FIG. 4). Unlike neighbor matrix 50, in neighbor matrix 50', any zero values are omitted and nonzero values are expressed as "N". For the purpose of computing the minimum relay set, relevant information concerns whether a link exists between two nodes (indicated by having a nonzero value in the corresponding entry) and the actual value for the entry is irrelevant.

Referring to FIG. 9B, entries in column 180 indicates the neighbor (one-and two-hop) that are "covered" or already accounted for in determining the multicast relay set. The nodes that are "covered" are able to receive the multicast message. Initially, multicast relay set is initialized to be an empty set. The process 160 marks one-hop neighbors of the source node, the node 42a, as covered in the column 180. For example, a covered neighbor is marked "Yes" in the column 180. Since one-hop neighbors will directly receive multicast message without requiring any multicast relay, the one-hop neighbors are marked "covered" (e.g., a "Yes" in column 180) Thus, the nodes 42a-42e are marked as covered in the column 180.

After marking all one-hop neighbors, all one-hop neighbors that are exclusively neighboring any two-hop neighbors are identified. These one-hop neighbors called, exclusive relay nodes, are exclusive relay nodes through which a set of two-hop neighbors can be reached. Exclusive relay nodes are identified by using neighbor matrix 50'. Among rows that are not yet marked "covered" (e.g., a "Yes" in column 180) those ones that contain a single entry with value of "N" are the two-hop relays that can be reached via exclusive relay nodes. The column corresponding to the entry with value "N" identifies the exclusive relays. For example, a row 182 and a row 184 are unmarked in FIG. 9B. The row 182 corresponding to the node 42g has a single "N" in the row under a column 192 corresponding to the node 42b. Node 42g is a two-hop node from the node 42a that can be only reached exclusively through the node 42b. Thus, node 42b will become a relay node 64. In FIG. 9C, column 180 is marked "Yes" or covered in row 182.

Figure 9D:

Once the complete set of exclusive relays are identified and included in the multicast relay set, one-hop neighbors which have the most two-hop neighbors that have not been covered are identified. Process 160 evaluates each row in the neighbor matrix 50' that has not yet been covered as indicated in the column 180. For each evaluated row, an entry that has "N" value and its corresponding column (thus corresponding node to the column) are then identified. After identifying the node corresponding to the column, the identified node's one-hop neighbors (thus two-hop neighbor of the source node) that are not yet covered are counted. For example, in FIG. 9C a row 184 is uncovered (e.g., there is no "Yes" in column 180 associated with the row 184) and includes "N" under the column 192 and a column 194. The column 192 includes three rows marked with an "N" while the column 194 includes two rows marked with an "N." Thus, the column 192, corresponding to the node 42b is used. Column 42b has already been identified as belonging in the multicast relay set. The final neighbor matrix is shown in FIG. 9D indicating in column 180 that all nodes 42b-42g have been accounted for. Thus, in this example for the neighborhood 40, the only relay node in the multicast relay set is the node 42b.

Once a multicast relay set is determined, the source node, the node 42a, can update its one-hop neighbors of its selection by transmitting it in control information (which can be embedded as a pair of data link update). Upon receiving the selection information, the one-hop neighbors store the selection information in their memory until the next update. Those nodes that are selected as multicast relay nodes for the source node will then relay any multicast message transmitted by the source node.

In one example, as would be understood by one of ordinary skill in the art, each of the one-hop neighbor nodes 42b-42e of the source node 42a would in turn perform process 160 and their one-hop neighbors would perform process 160 and so forth until all of the relay nodes have been determined in the network so that all of the nodes may receive a multicast message.

Figure 10:
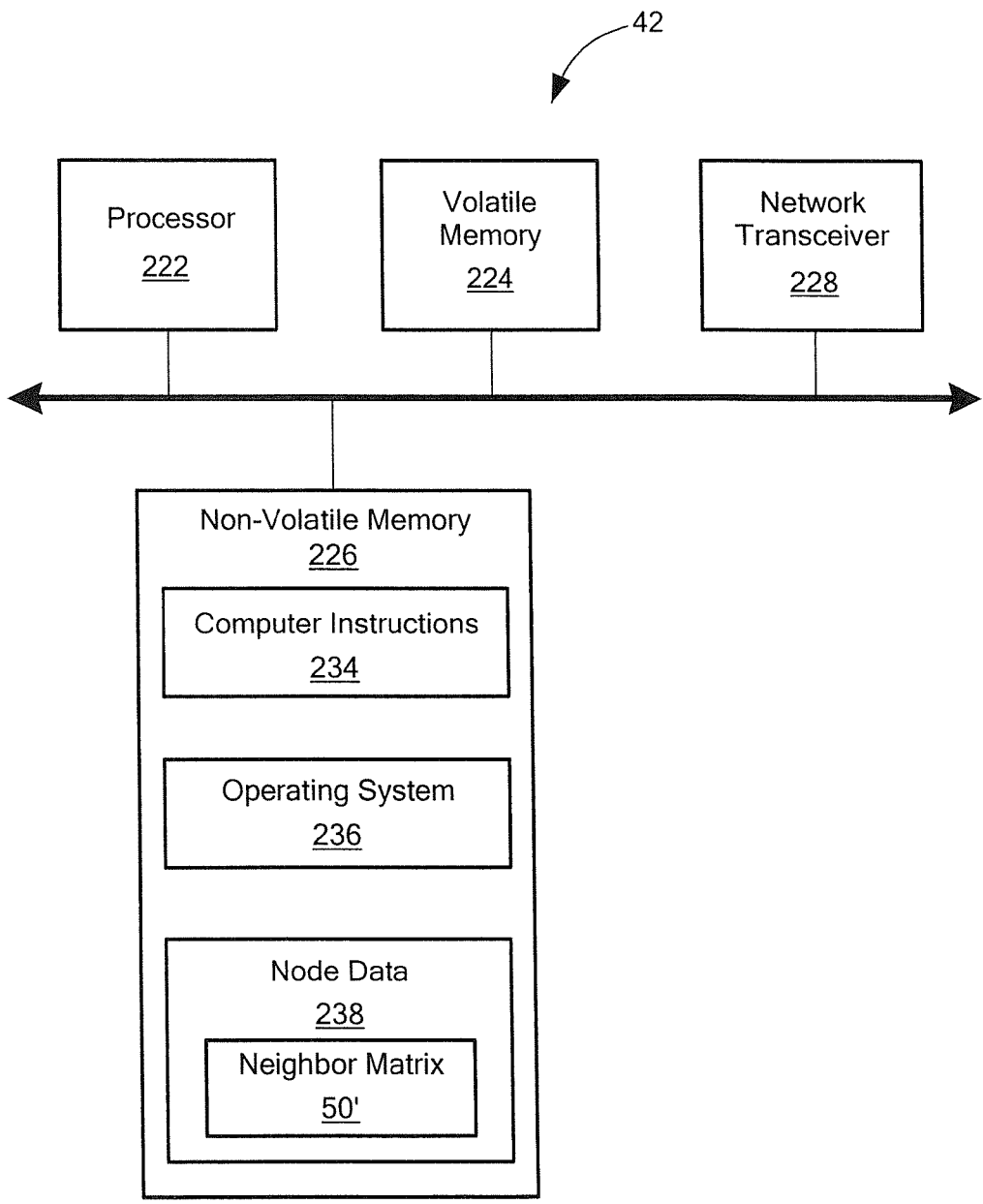
FIG. 10 is a block diagram of a computer on which the process of FIG. 8 may be implemented.

Referring to FIG. 10, nodes 42a-42g may be represented by a node 42. The node 42 includes a processor 222, a volatile memory 224, a non-volatile memory 226 (e.g., a hard disk) and a network transceiver 228. The non-volatile memory 226 stores computer instructions 234, an operating system 236 and node data 238 such as the neighbor matrix 50'. The transceiver 228 is used to communicate with the other network nodes. In one example, the computer instructions 234 are executed by the processor 222 out of volatile memory 224 to perform at least some or part of process 160.

The processes described herein (e.g., the process 160) are not limited to use with the hardware and software of FIG. 10; it may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform the processes and to generate output information.

The system may be implemented, at least in part, via a computer program product, (e.g., in a machine-readable medium such as a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 160. Process 160 may also be implemented as a machine-readable medium, configured with a computer program, where upon execution, instructions in the computer program cause the computer to operate in accordance with the processes (e.g., the process 160).

The processes described herein are not limited to the specific embodiments described herein. For example, the process 160 is not limited to the specific processing order of FIG. 8, respectively. Rather, any of the processing blocks of FIG. 8 may be re-ordered, combined or removed, preformed in parallel or in serial, as necessary, to achieve the results set forth above.

The processing blocks in FIG. 8 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method to multicast in a network comprising:
   determining using a processor a least amount of relay nodes to multicast a message from a source node to all other nodes in the network by using a neighbor matrix of the source node stored in the data link layer of the source node and used in Node Activation Multiple Access (NAMA) scheduling by:
   designating a one-hop neighbor of the source node that exclusively accesses a two-hop neighbor of the source node as a relay node;
   designating a one-hop neighbor of the source node with accessibility to a maximum number of two-hop neighbors of the source node as a relay node;
   indicating in a field of the neighbor matrix associated with the exclusive one-hop neighbor that the exclusive one-hop neighbor is covered;
   indicating in a field of the neighbor matrix associated with the two-hop neighbor of the source node that is accessed exclusively by the exclusive one-hop neighbor of the source node that the two-hop neighbor is covered; and
   notifying one-hop neighbors of the source node that are selected as relay nodes of their selection as relay nodes.

2. The method of claim 1 wherein designating a one-hop neighbor of the source node with accessibility to a maximum number of two-hop neighbors of the source node as a relay node comprises designating a one-hop neighbor of the source node with accessibility to a maximum number of two-hop neighbors of the source node as a relay node that do not have a field in the neighbor matrix of the source node indicating that the two-hop neighbors are already covered.

3. The method of claim 1, further comprising:
   at a second node being a one-hop neighbor of the source node, determining a least amount of relay nodes for use in multicasting a message nodes in the network by using a neighbor matrix of the second node by:
   designating a one-hop neighbor that exclusively accesses a two-hop neighbor of the second node as a relay node;
   designating a one-hop neighbor of the second node with accessibility to a maximum number of two-hop neighbors of the second node as a relay node; and
   notifying one-hop neighbors of the second node that are selected as relay nodes of their selection as relay nodes.

4. The method of claim 1, further comprising connecting the nodes in the network by links wherein at least one of the links is a wireless link.

5. The method of claim 1, further comprising providing each node with a neighbor matrix which is maintained by each node for NAMA scheduling.

6. The method of claim 5 wherein providing each node with a neighbor matrix comprises providing each node with a neighbor matrix which identifies one-hop neighbors and two-hop neighbors.

7. The method of claim 6 wherein providing each node with a neighbor matrix comprises providing each node with a neighbor matrix in a table format that indicates a neighbor relationship between two nodes by having a nonzero value in an entry of the table corresponding to a row and a column associated with the two nodes.

8. An article comprising:
   a non-transitory machine-readable medium that stores executable instructions to multicast in a network, the instructions causing a machine to determine a least amount of relay nodes to multicast a message from a source node to all other nodes in the network by using a neighbor matrix of the source node stored in the data link layer of the source node and used in Node Activation Multiple Access (NAMA) scheduling by:

designating a one-hop neighbor that exclusively accesses a two-hop neighbor of the source node as a relay node;

designating a one-hop neighbor of the source node with accessibility to a maximum number of two-hop neighbors of the source node as a relay node;

indicating in a field of the neighbor matrix associated with the one-hop neighbor that exclusively accesses a two-hop neighbor of the source node that the one-hop neighbor that exclusively accesses a two-hop neighbor of the source node is covered; indicating in a field of the neighbor matrix associated with the two-hop neighbor of the source node that is accessed exclusively by the one-hop neighbor of the source node that the two-hop neighbor is covered; and notifying one-hop neighbors of the source node that are selected as relay nodes of their selection as relay nodes.

9. The article of claim 8, further comprising at a second node being a one-hop neighbor of the source node instructions causing a machine to:

designate a one-hop neighbor that exclusively accesses a two-hop neighbor of the second node as a relay node;

designate a one-hop neighbor of the second node with accessibility to a maximum number of two-hop neighbors of the second node as a relay node; and notify one-hop neighbors of the second node that are selected as relay nodes of their selection as relay nodes.

10. An apparatus to multicast in a network, comprising:

circuitry to determine a least amount of relay nodes to multicast a a message from a source node to all other nodes in the network by using a neighbor matrix of the source node stored in the data link layer of the source node and used in Node Activation Multiple Access (NAMA) scheduling by:

designating a one-hop neighbor that exclusively accesses a two-hop neighbor of the source node as a relay node;

designating a one-hop neighbor of the source node with accessibility to a maximum number of two-hop neighbors of the source node as a relay node;

indicating in a field of the neighbor matrix associated with the one-hop neighbor that exclusively accesses a two-hop neighbor of the source node that the one-hop neighbor that exclusively accesses a two-hop neighbor of the source node is covered; indicating in a field of the neighbor matrix associated with the two-hop neighbor of the source node that is accessed exclusively by the one-hop neighbor of the source node that the two-hop neighbor is covered; and notifying one-hop neighbors of the source node that are selected as relay nodes of their selection as relay nodes.

11. The apparatus of claim 10 wherein the circuitry comprises at least one of a processor, a memory, programmable logic and logic gates.

12. The apparatus of claim 10, further comprising at a second node being a one-hop neighbor of the source node circuitry configured to:

designate a one-hop neighbor that exclusively accesses a two-hop neighbor of the second node as a relay node;

designate a one-hop neighbor of the second node with accessibility to a maximum number of two-hop neighbors of the second node as a relay node; and notify one-hop neighbors of the second node that are selected as relay nodes of their selection as relay nodes.

* * * * *